(12) United States Patent
Soares et al.

(10) Patent No.: US 7,947,186 B2
(45) Date of Patent: May 24, 2011

(54) CENTRIFUGAL DEVICE AND METHOD FOR FLUID COMPONENT SEPARATION

(75) Inventors: Todd W. Soares, Bellingham, MA (US); Kevin Sullivan, Chestnut Hill, MA (US)

(73) Assignee: Statspin, Inc., Westwood, MA (US)

( * ) Notice: Subject to any disclaimer, the term of this patent is extended or adjusted under 35 U.S.C. 154(b) by 604 days.

(21) Appl. No.: 12/154,389

(22) Filed: May 22, 2008

(65) Prior Publication Data
US 2009/0291818 A1    Nov. 26, 2009

(51) Int. Cl.
*B04B 3/00* (2006.01)
*B01D 21/26* (2006.01)
*B01D 43/00* (2006.01)

(52) U.S. Cl. .................. 210/782; 210/360.1; 210/380.1; 210/515; 210/516; 494/22; 494/37; 494/45; 422/72; 422/527

(58) Field of Classification Search .................. 210/782, 210/360.1, 380.1, 515, 516; 494/22, 37, 494/45; 422/72, 527
See application file for complete search history.

(56) References Cited

U.S. PATENT DOCUMENTS

| | | | |
|---|---|---|---|
| 4,257,886 A * | 3/1981 | Kessler | .......................... 210/516 |
| 4,707,276 A | 11/1987 | Dodge et al. | |
| 4,846,974 A | 7/1989 | Kelley et al. | |
| 4,854,933 A | 8/1989 | Mull | |
| 4,981,585 A | 1/1991 | Kelley et al. | |
| 5,213,765 A | 5/1993 | Kasai et al. | |
| 5,257,633 A | 11/1993 | Vogler et al. | |
| 5,454,958 A | 10/1995 | Fiehler | |
| 5,472,603 A | 12/1995 | Schembri | |
| 6,238,578 B1 | 5/2001 | Fiehler | |
| 2005/0178218 A1 | 8/2005 | Montagu | |
| 2006/0078873 A1 | 4/2006 | Ogawa et al. | |
| 2006/0237375 A1 | 10/2006 | Xiang et al. | |
| 2007/0190148 A1 | 8/2007 | Cronin et al. | |
| 2007/0274863 A1 | 11/2007 | Kido et al. | |
| 2008/0076182 A1 | 3/2008 | Takahashi et al. | |

OTHER PUBLICATIONS

Written Opinion for PCT/US2009/044837, Jun. 2009.*

* cited by examiner

*Primary Examiner* — David A Reifsnyder
(74) *Attorney, Agent, or Firm* — Weingarten, Schurgin, Gagnebin & Lebovici LLP

(57) ABSTRACT

A rotor is provided for the centrifugal separation of a composite fluid, such as animal or human blood, into components. An inner surface of the rotor includes at least one hydrophobic area having a first surface energy sufficiently low to provide a flow path for a lower density fluid component to flow to the bottom of a central collection chamber after centrifugal separation. A method of separating a composite fluid into components using such a rotor is also provided. Additionally, a method of manufacturing such a rotor is provided.

20 Claims, 7 Drawing Sheets

US 7,947,186 B2

CENTRIFUGAL DEVICE AND METHOD FOR FLUID COMPONENT SEPARATION

CROSS REFERENCE TO RELATED APPLICATIONS

N/A

STATEMENT REGARDING FEDERALLY SPONSORED RESEARCH OR DEVELOPMENT

N/A

FIELD OF THE INVENTION

The present invention relates to the field of fluid centrifuging and in particular to the centrifuging of blood specimens.

BACKGROUND OF THE INVENTION

Human and animal blood specimens are frequently analyzed to determine the concentrations of components useful in diagnosis and preventive medicine. To perform these analyses, whole blood is separated into the components of plasma and particulates such as blood cells, or coagulated or clotted blood is separated into serum and the solids. Such separations are preformed by centrifuging. In centrifuging, the serum or plasma is lighter in weight and collects radially closer to the spin axis of the centrifuged container. A thixotropic gel, which has a density between the density of the blood cells and the density of the plasma, is generally used to maintain the separation between the blood cells and the plasma.

A centrifuge system employing a disc-shaped cassette or rotor is known, which can accomplish the desired separation rapidly. U.S. Pat. Nos. 4,846,974 and 4,981,585 disclose a suitable centrifuge system of this type.

SUMMARY OF THE INVENTION

A centrifugal device is provided for the rapid separation of composite fluids, such as animal or human blood, especially using small sample volumes of less than 1 ml. When prior art centrifugal rotors are scaled down for smaller sample volumes, a significant volume of a separated lower-density fluid component, such as blood plasma, may cling to a residual film of thixotropic separating gel in the central collection chamber left behind during manufacture of the rotor. This volume may be significant enough that the yield of the separated fluid component is inadequate for further analysis. The present centrifugal device overcomes this problem by providing a lower surface energy, or hydrophobic, flow path(s) in the central collection chamber for the separated fluid component.

More particularly, the centrifugal device comprises a cassette or rotor having a peripheral collection chamber and a central collection chamber. During manufacture, a thixotropic separating gel is disposed in the peripheral collection chamber by depositing a controlled volume of the gel in one or more locations on an inner surface of the central collection chamber and giving the rotor a brief spin. As the rotor spins, the gel moves radially over the surface of the central collection chamber, leaving a fan-shaped residual thin coating on the surface of the central collection chamber. The gel film is hydrophilic, whereas the uncoated areas between the gel film areas are hydrophobic. During subsequent centrifugation to separate a sample fluid such as blood, the hydrophobic areas of uncoated material provide a direct unobstructed downhill pathway for the movement of plasma droplets into the central collection chamber at the completion of the spin separation.

DESCRIPTION OF THE DRAWINGS

The invention will be more fully understood from the following detailed description taken in conjunction with the accompanying drawing in which.

DETAILED DESCRIPTION OF THE INVENTION

Figure 1:
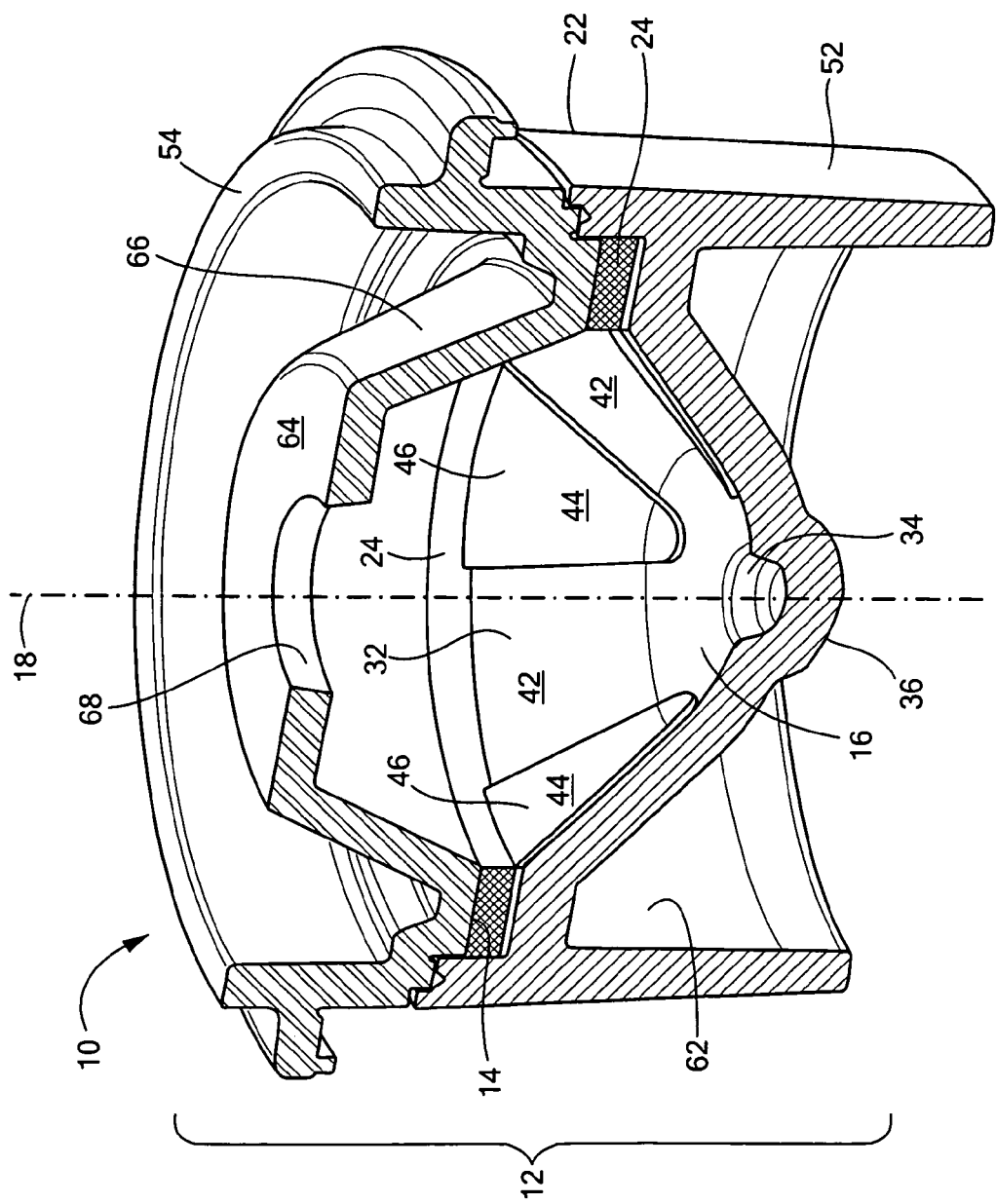
FIG. 1 is an isometric cross-sectional view of a centrifugal cassette or rotor according to the present invention.
Figure 2:
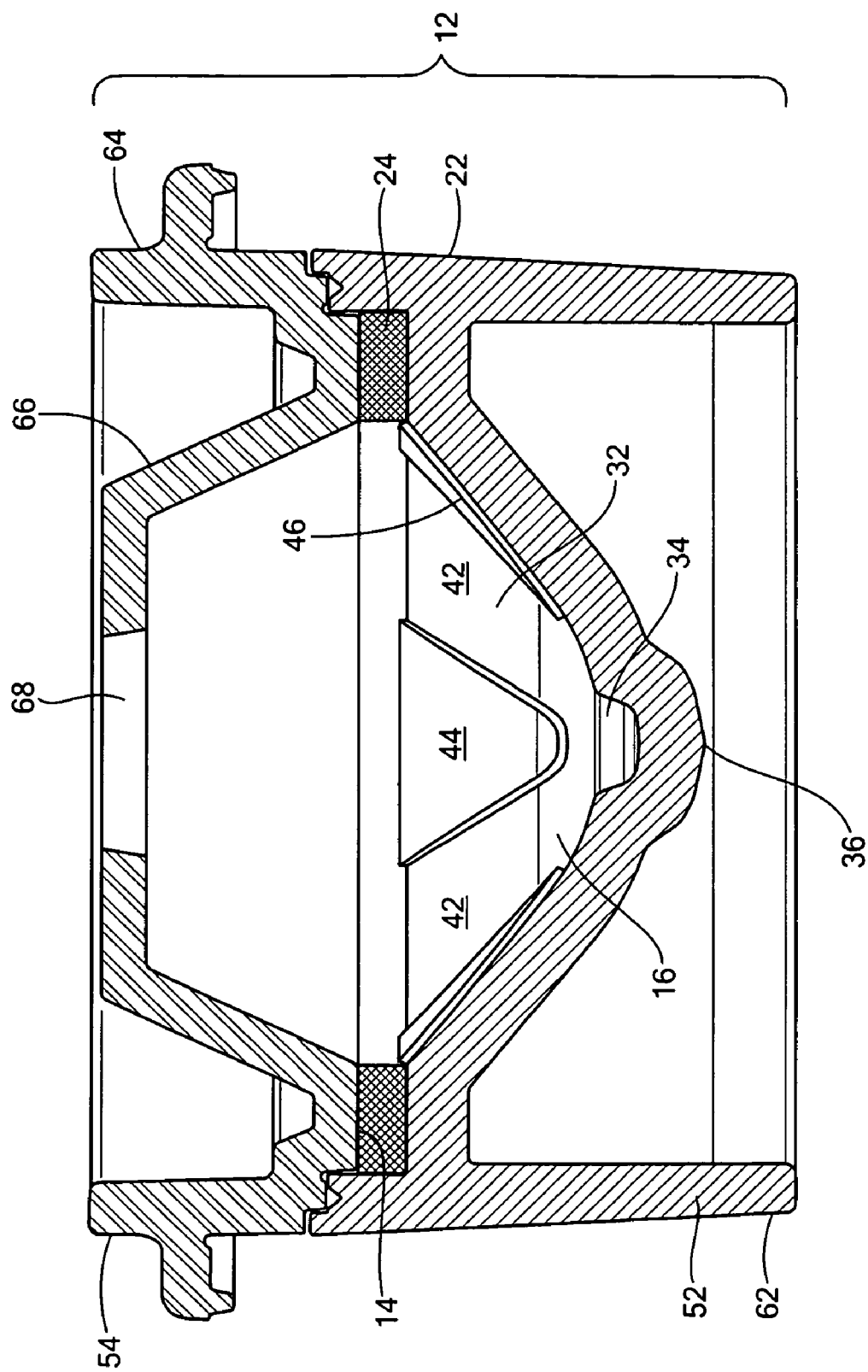
FIG. 2 is a further cross-sectional view of the rotor of FIG. 1.

A centrifugal device 10 such as a cassette or rotor according to the present invention is illustrated in FIGS. 1 and 2. The rotor is particularly suitable for the separation of small sample volumes, such as less than 1 ml. The rotor includes a generally disc-shaped container housing 12 having a peripheral collection chamber 14 and a central collection chamber 16 arranged about a central spin axis 18.

The peripheral collection chamber 14 is preferably an annular chamber extending continuously about the peripheral circumference 22 of the housing 12. During manufacture, the peripheral collection chamber is filled with a controlled volume of a thixotropic separating gel 24, discussed further below. The gel is selected to have a density between the density of the various fluid components to be separated. Also, the gel is selected for its insolubility in the fluid components and for purity, inertness, viscosity, and time and temperature stability. Suitable gels for use in blood separation are BD P5A and Organon.

The central collection chamber 16 includes a downwardly sloping, preferably conical wall 32 and may include a depression 34 at the closed bottom 36. Other configurations of the central collection chamber, as well as the peripheral collection chamber, can be provided. The downwardly sloping wall 32 is provided with one or more hydrophobic areas 42 having a lower surface energy, to counter the presence of one or more hydrophilic areas 44 having a greater surface energy, which occur when the separating gel 24 is introduced into the rotor during manufacture, as discussed more fully below. The hydrophobic area(s) 42 provides a pathway(s) along which the less dense separated fluid component(s) (e.g., plasma) can flow more readily into the bottom of the central collection chamber. In one embodiment, the hydrophobic areas are provided as the remaining areas between hydrophilic areas of gel film 46, by selective coating of the conical wall 32 with the separating gel 24 during manufacture.

The container housing 12 also includes a depending collar 52 for mounting to a centrifuge and an upstanding rim 54. The housing can be formed in any suitable configuration and in any suitable manner. In the embodiment shown, the housing is formed in two pieces, a base 62 and a cover 64, attached about their circumferential peripheries in any suitable manner, for example, by solvent-bonding or ultrasonic welding. The cover of the housing preferably includes a conical portion 66 and a central aperture 68 through which a fluid sample is inserted prior to centrifuging and through which the separated components can be removed after centrifuging.

Figure 3:
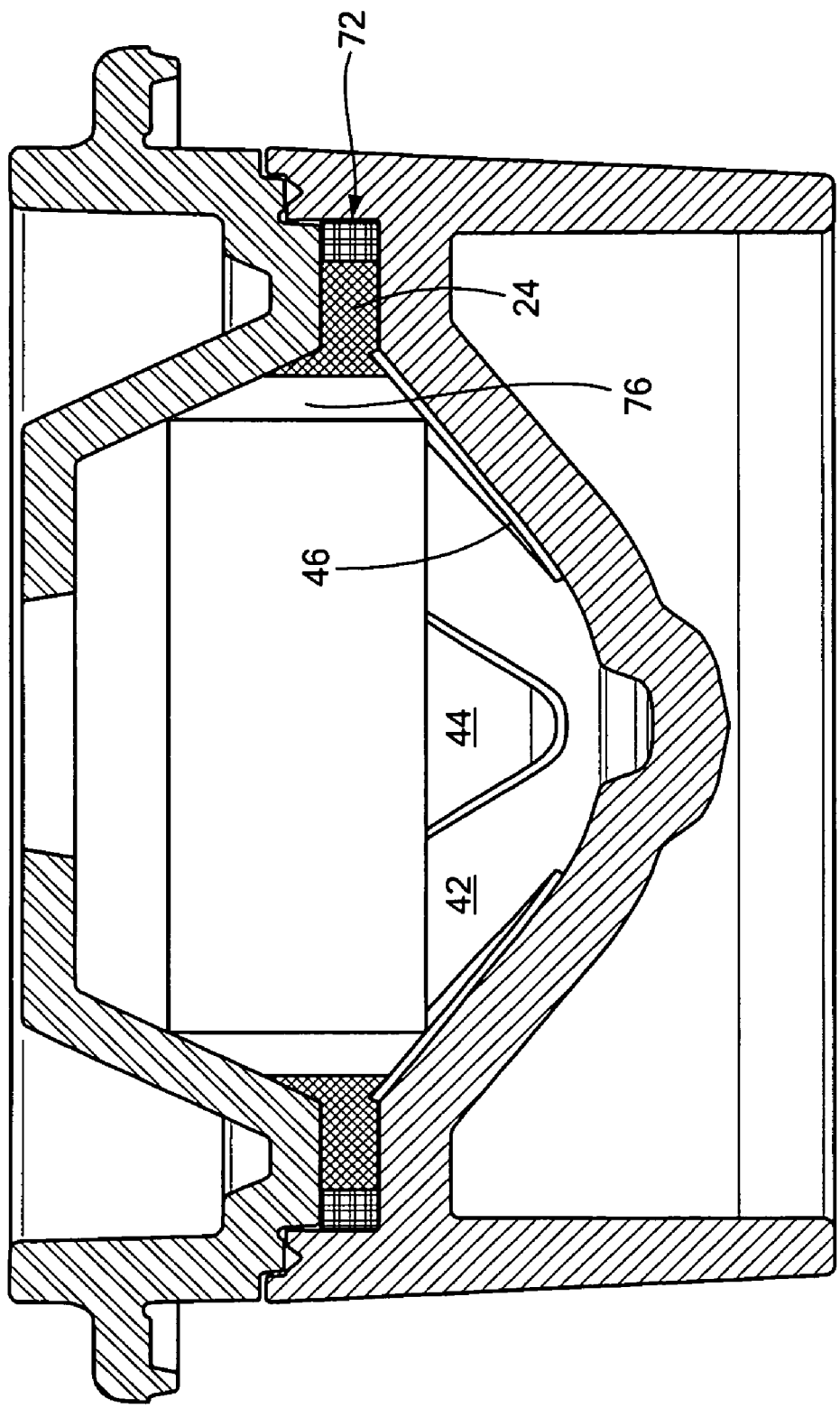
FIG. 3 is a cross-sectional view of the rotor of FIG. 1 illustrating separation of a blood sample with locations of plasma, gel, and red blood cells during centrifugation.

In operation to separate, for example, a blood sample, a controlled volume of blood is dispensed into the central collection chamber 16 of the rotor 10 through the aperture 68. The filled disc is spun at high speed, forcing blood components into the annular peripheral collection chamber. High centrifugal forces produce the rapid sedimentation of blood cells according to density, with red cells 72 at the maximum radius. See FIG. 3. The separation gel 24, which is chosen to have a density between the cellular components and the plasma 76, forms an intermediate layer, leaving the clear plasma 76 as the layer closest to the spin axis 18 at the center of the spinning disc. The high speed rotation is continued for a sufficient time to achieve full separation of the components. For example, for a whole blood sample, the time is generally from 30 to 90 seconds. When the spin cycle stops, the ring of thixotropic gel 24 remains in place, trapping the cells in the narrow annular peripheral collection chamber 14 of the disc, while the fluid plasma 76 flows down into the depression 34 of the central collection chamber 16 where it can be retrieved for further testing.

As noted above, the peripheral collection chamber 16 is filled with the separating gel during manufacture of the rotor. With a prior art rotor such as illustrated in U.S. Pat. Nos. 4,846,974 and 4,981,585, the separating gel is dispensed in a single volume into the center of the rotor and is evenly distributed into the peripheral collection chamber by a brief spin of the rotor. This spin also leaves a continuous ring-shaped thin coating or film of gel on most of the downwardly sloping surface of the central collection chamber. This gel, however, has a high surface energy and is hydrophilic to plasma. The gel film is readily wetted by the plasma, which spreads out and clings to its surface. Thus, when a prior art rotor is used to separate a blood sample, a small fraction of the resulting plasma volume clings to the gel film by capillary action, particularly at the edges of the annular ring of gel film. This fraction of the plasma does not flow down to the bottom of the central collection chamber. With the relatively large volumes of plasma generated in the prior art rotor, this small fraction of lost plasma is not an issue. However, when the rotor is scaled down to accommodate smaller sample volumes, for example, less than 1 ml and generally 0.3-0.6 ml, factors such as a higher surface area-to-volume ratio and the increased influence of capillary forces at reduced dimensions can result in a larger fraction of the recovered plasma volume clinging to the rim of the central collection chamber and unavailable to the user, to the point where the yield may be inadequate for further analysis.

Accordingly, the rotor 10 of the present invention provides one or more hydrophobic areas 42 or areas having a lesser surface energy on the downwardly sloping wall 32 of the central collection chamber 16, along which the less dense, separated fluid component can more readily flow to the bottom.

In one embodiment, the hydrophobic area(s) or area(s) of lesser surface energy is provided by the material from which the rotor is manufactured. For blood separation, a styrenic polymer such as a styrene-butadiene copolymer is a suitable material. K-Resin® is an example of a suitable styrenic polymer commercially available from Chevron Phillips Chemical. Small volumes of plasma "bead up" on the surface of this material.

In conjunction with forming the rotor from a hydrophobic material, the deposition of the separating gel is controlled during the manufacturing process such that one or more radial segments of the surface of the central collection area remain clear of any gel coating and retain their low surface energy properties. Thus, the uncoated hydrophobic areas provide an unobstructed path for the droplets of plasma to bead up on the surface of the collection chamber and to roll down to the depression at the bottom of the collection chamber at the end of the spin cycle.

More particularly, during the gel loading process for the rotor of the present invention, the required volume of gel is divided into a plurality of volumes 82, which are deposited in a circular pattern around the upper perimeter of the central collection chamber. In one embodiment, the gel is deposited in four equal volumes in a circular pattern. See FIG. 4. The gel can be deposited in any suitable manner. For example, the gel can be pumped simultaneously through multiple tips of a nozzle head, the tips being arranged in the desired pattern. In an alternative, the nozzle head can have a single tip through which the gel is pumped periodically, with either rotation of the nozzle head or rotation of the rotor to place the gel in the appropriate locations.

After the gel is deposited in the rotor, the rotor is spun with an acceleration, speed, and time chosen to move the gel in a radial path to the outer wall of the annular collection chamber, where it flows circumferentially to uniformly fill that chamber with the specified volume of gel. As the gel moves radially over the surface of the central collection chamber, it leaves a fan-shaped residual thin coating 84 on the surface. By controlling the location and distribution of these gel-coated areas, continuous areas of uncoated surface remain to provide a direct unobstructed downhill pathway for the movement of plasma droplets or other lower density fluid component into the central collection chamber at the completion of the spin separation.

Figure 4:
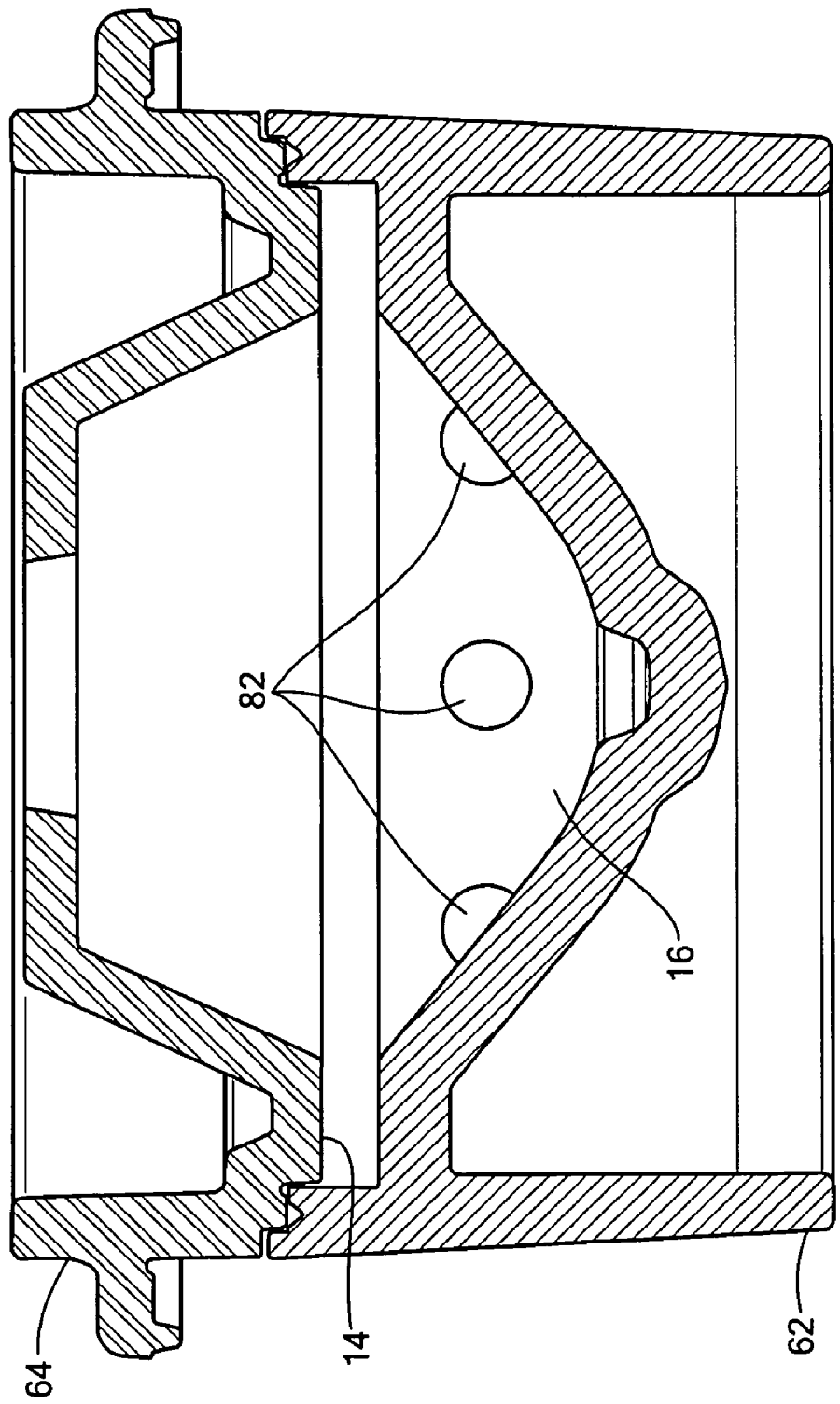
FIG. 4 is a cross-sectional view of the rotor of FIG. 1 illustrating deposition of the separating gel during manufacture.
Figure 5:
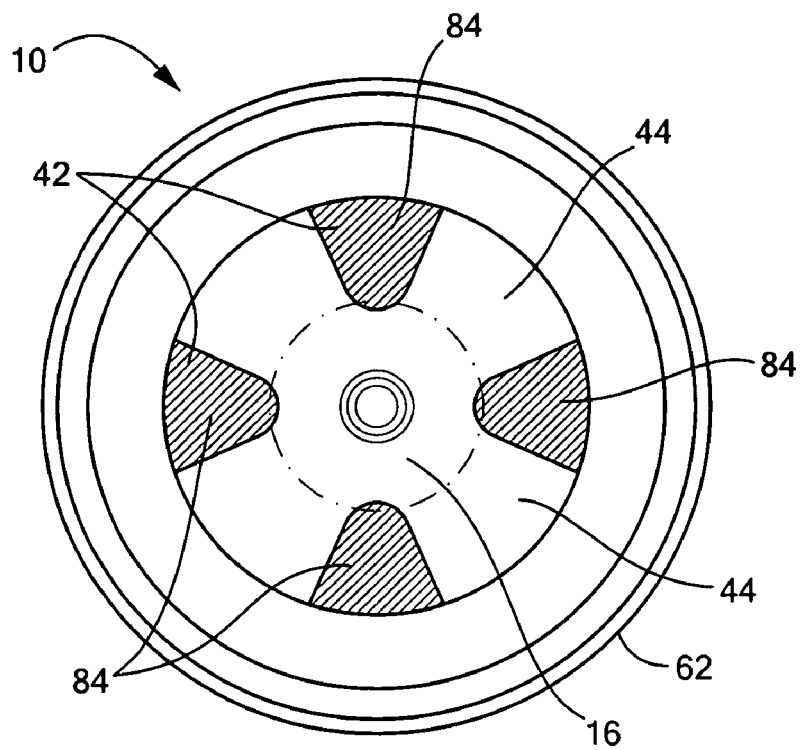
FIG. 5 is a top plan view illustrating hydrophobic areas and hydrophilic gel film areas formed during manufacture in a 4-region pattern.
Figure 6:
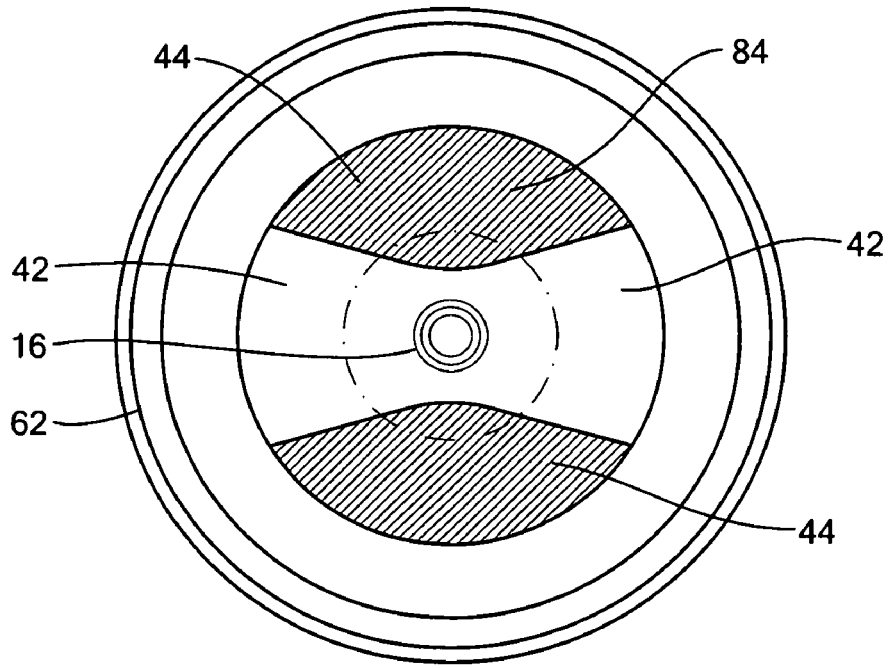
FIG. 6 is a top plan view illustrating hydrophobic areas and hydrophilic gel film areas formed during manufacture in a 2-region pattern.
Figure 7:
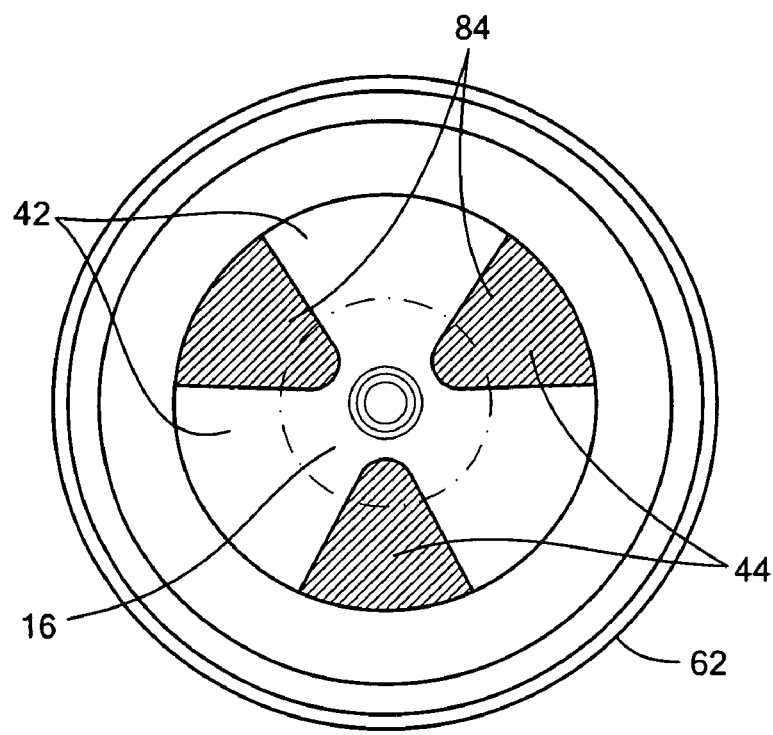
FIG. 7 is a top plan view illustrating hydrophobic areas and hydrophilic gel film areas formed during manufacture in a 3-region pattern.
Figure 8:
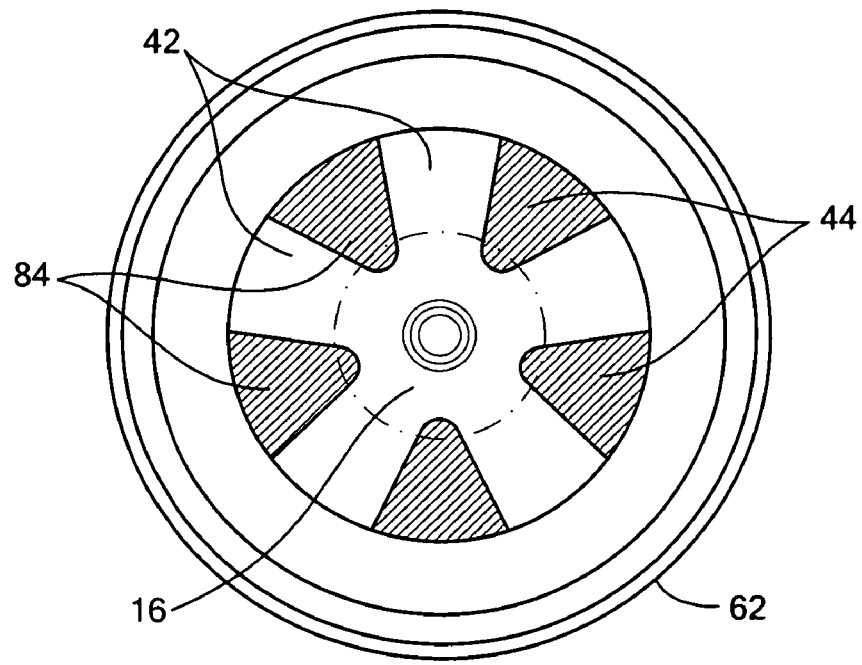
FIG. 8 is a top plan view illustrating hydrophobic areas and hydrophilic gel film areas formed during manufacture in a 5-region pattern.
Figure 9:
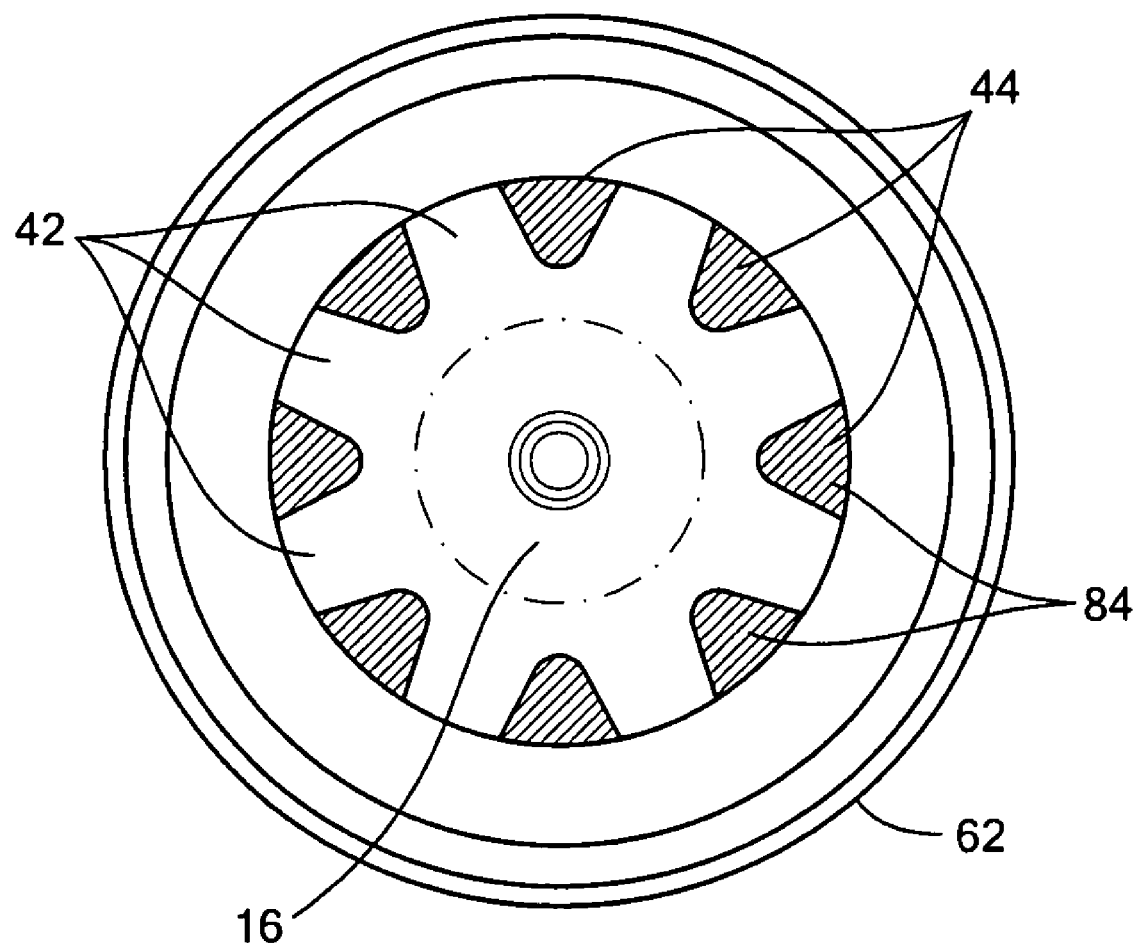
FIG. 9 is a top plan view illustrating hydrophobic areas and hydrophilic gel film areas formed during manufacture in a 8-region pattern.

FIGS. 4 and 5 illustrate one embodiment in which four hydrophobic and four hydrophilic areas are provided, equally spaced around the central collection chamber. Other patterns can be provided if desired. For example, FIG. 6 illustrates two hydrophobic and two hydrophilic regions. FIG. 7 illustrates three hydrophobic and three hydrophilic regions. FIG. 8 illustrates five hydrophobic and five hydrophilic regions. FIG. 9 illustrates eight hydrophobic and eight hydrophilic regions.

A central collection chamber having a surface that is fully hydrophobic (for example, lacking a region of gel film) can also inhibit the flow of the lower density fluid component to the bottom of the chamber. The surface of the central collection chamber can be treated in other ways to provide a desired pattern of both hydrophobic or lower surface energy areas and hydrophilic or higher surface energy areas. For example, selected areas of the surface can be treated with ozone, corona discharge, or plasma treatments to raise the surface energy, as will be appreciated by those of skill in the art. The surface energies of the various areas can be selected depending on the fluid to be separated to ensure flow of the lower density separated fluid component to the bottom of the chamber.

It will be appreciated that the rotor can have a variety of configurations to which the hydrophobic and hydrophilic areas can be applied. See, for example, U.S. Pat. Nos. 4,846,974 and 4,981,585, which illustrate rotors having a number of different configurations. The invention is not to be limited by what has been particularly shown and described, except as indicated by the appended claims.

What is claimed is:

1. A rotor for centrifugal separation of a composite fluid into components comprising:
    a generally disc-shaped container housing having a spin axis, the container housing extending radially outwardly from the spin axis to an outer perimeter and rotatable about the spin axis to effect centrifugal separation of the composite fluid, and an aperture in an upper surface of the housing;
    a peripheral collection chamber within the housing and disposed radially outwardly from the spin axis toward the outer perimeter of the container housing;
    a central collection chamber within the housing and located centrally about the spin axis and in fluid communication with the peripheral collection chamber, the collection chamber having a downwardly sloping inner surface and a closed bottom;
    the inner surface including at least one hydrophobic area having a first surface energy sufficiently low to provide a flow path for a lower density fluid component to flow to the closed bottom, and at least one hydrophilic area having a second surface energy greater than the first surface energy; and
    a separating material comprising a thixotropic gel disposed within the peripheral collection chamber and having a volume and density sufficient to form a barrier between the components of the composite fluid during centrifugal separation.

2. The rotor of claim 1, wherein the hydrophilic area comprises a film of the thixotropic gel on the inner surface.

3. The rotor of claim 1, wherein the density of the thixotropic gel is less than the density of cellular components of blood and greater than the density of blood plasma.

4. The rotor of claim 1, wherein the hydrophobic area comprises an uncoated surface of the material forming the central collection chamber.

5. The rotor of claim 4, wherein the material of the central collection chamber comprises a styrenic polymer.

6. The rotor of claim 4, wherein the material of the central collection chamber comprises a styrene-butadiene copolymer.

7. The rotor of claim 1, wherein the housing is comprised of a styrenic polymer and the styrenic polymer forms the hydrophobic area of the inner surface of the central collection chamber.

8. The rotor of claim 1, wherein the hydrophilic area comprises a portion of the surface of the material forming the central collection chamber treated with an ozone treatment, a corona discharge treatment, or a plasma treatment to raise the surface energy.

9. The rotor of claim 1, further comprising at least a further hydrophobic area and at least a further hydrophilic area.

10. The rotor of claim 9, wherein the hydrophobic areas and the hydrophilic areas are spaced equidistantly about the inner surface.

11. The rotor of claim 1, wherein the peripheral collection chamber comprises an annular chamber.

12. A method of manufacturing a rotor for centrifugal separation of a composite fluid into components, comprising:
    providing a rotor comprising:
        a generally disc-shaped container housing having a spin axis, the container housing extending radially outwardly from the spin axis to an outer perimeter and rotatable about the spin axis to effect centrifugal separation of the composite fluid, and an aperture in an upper surface of the housing,
        a peripheral collection chamber within the housing and disposed radially outwardly from the spin axis toward the outer perimeter of the container housing, and
        a central collection chamber within the housing and located centrally about the spin axis and in fluid communication with the peripheral collection chamber, the collection chamber having a downwardly sloping inner surface and a closed bottom;
    depositing a volume of a separating material comprising a thixotropic gel on the inner surface of the central collection chamber;
    spinning the container housing about the spin axis for a time and at a speed sufficient to move at least most of the separating material into the peripheral collection chamber, wherein a film of the separating material remains on a first area of the central collection chamber while a second area of the central collection area remains free of the separating material, and wherein the first area of the film of separating material comprises a hydrophilic area having a greater surface energy, and the second area free of the separating material comprises a hydrophobic area having a lesser surface energy.

13. The method of claim 12, further comprising depositing the separating material in a plurality of locations spaced equidistantly about the inner surface.

14. The method of claim 12, comprising forming the housing of a hydrophobic material.

15. The method of claim 14, wherein the hydrophobic material comprises a styrenic polymer.

16. The method of claim 14, wherein the hydrophobic material comprises a styrene-butadiene copolymer.

17. The method of claim 12, wherein the thixotropic gel has a density less than the density of cellular components of blood and greater than the density of blood plasma.

18. A method of separating a composite fluid into components, comprising:
    providing a rotor comprising:
        a generally disc-shaped container housing having a spin axis, the container housing extending radially outwardly from the spin axis to an outer perimeter and rotatable about the spin axis to effect centrifugal separation of the composite fluid, and an aperture in an upper surface of the housing,
        a peripheral collection chamber within the housing and disposed radially outwardly from the spin axis toward the outer perimeter of the container housing,
        a central collection chamber within the housing and located centrally about the spin axis and in fluid communication with the peripheral collection chamber, the collection chamber having a downwardly sloping inner surface and a closed bottom,
        the inner surface including at least one hydrophobic area having a first surface energy sufficiently low to provide a flow path for a lower density fluid component to flow to the closed bottom, and at least one hydrophilic area having a second surface energy greater than the first surface energy, and a separating material comprising a thixotropic gel disposed within the peripheral collection chamber and having a volume and density sufficient to form a barrier between the components of the composite fluid during centrifugal separation;

disposing the composite fluid to be separated into the central collection chamber;

spinning the rotor about the spin axis for a time and at a speed sufficient to separate the fluid into components, at least a first component forced into the peripheral collection chamber radially outwardly of the separating material, at least a second component remaining radially inwardly of the separating material; and stopping the spinning of the rotor, whereby the second component flows downwardly along at least the hydrophobic area of the inner surface to the closed bottom of the central collection chamber.

19. The method of claim 18, wherein the composite fluid to be separated comprises human or animal blood and the second fluid component comprises blood plasma.

20. The method of claim 18, wherein the density of the thixotropic gel is less than the density of cellular components of blood and greater than the density of blood plasma.

* * * * *